United States Patent
Brown

(10) Patent No.: US 10,067,283 B2
(45) Date of Patent: Sep. 4, 2018

(54) DISPLAY BACKLIGHT WITH PATTERNED BACKLIGHT EXTRACTION RIDGES

(71) Applicant: Apple Inc., Cupertino, CA (US)

(72) Inventor: Michael J. Brown, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 14/848,721

(22) Filed: Sep. 9, 2015

(65) Prior Publication Data

US 2016/0178830 A1    Jun. 23, 2016

Related U.S. Application Data

(60) Provisional application No. 62/096,065, filed on Dec. 23, 2014.

(51) Int. Cl.
*G02F 1/1335*      (2006.01)
*F21V 8/00*        (2006.01)

(52) U.S. Cl.
CPC ......... *G02B 6/0061* (2013.01); *G02B 6/0036* (2013.01); *G02B 6/0038* (2013.01); *G02B 6/002* (2013.01); *G02B 6/0016* (2013.01)

(58) Field of Classification Search
CPC .. G02B 6/0061; G02B 6/0038; G02B 6/0036; G02B 6/002; G02B 6/0016
USPC .......................................................... 349/61
See application file for complete search history.

(56) References Cited

U.S. PATENT DOCUMENTS

| | | | |
|---|---|---|---|
| 6,285,426 | B1 | 9/2001 | Akins et al. |
| 7,108,416 | B1* | 9/2006 | Osawa .................. G02B 6/005 |
| | | | 362/600 |
| 7,918,600 | B2 | 4/2011 | Nagata et al. |
| 8,033,706 | B1 | 10/2011 | Kelly et al. |
| 8,096,693 | B2 | 1/2012 | Taya et al. |
| 8,678,636 | B2 | 3/2014 | Song et al. |
| 8,879,017 | B2 | 11/2014 | Hsiao et al. |
| 2002/0196388 | A1* | 12/2002 | Ohkawa ............ G02F 1/133603 |
| | | | 349/61 |
| 2004/0012944 | A1* | 1/2004 | Suzuki ................. G02B 6/0036 |
| | | | 362/619 |

(Continued)

FOREIGN PATENT DOCUMENTS

| | | |
|---|---|---|
| CN | 1619375 A | 5/2005 |
| CN | 2763838 Y | 3/2006 |

(Continued)

*Primary Examiner* — Hoan C Nguyen
(74) *Attorney, Agent, or Firm* — Treyz Law Group, P.C.; G. Victor Treyz; Joseph F. Guihan

(57) ABSTRACT

A display may have a backlight unit with a row of light-emitting diodes that emit light into the edge of a light guide plate. The light guide plate may have opposing upper and lower surfaces. Backlight may be extracted from the light guide plate using an array of bumps on the lower surface and ridges on the upper surface. Ridge density may vary as a function of location across the display. Some of the ridges may be terminated along a meandering border between regions of differing ridge density. Ridge length and endpoint location can be dithered along borders between regions and ridge widths and thicknesses may be tapered down towards the endpoints. Ridges may be patterned to reduce the density of the ridges immediately adjacent the light-emitting diodes and thereby avoid over-extraction of the light at the light-emitting diodes.

20 Claims, 13 Drawing Sheets

(56) References Cited

U.S. PATENT DOCUMENTS

| | | | | |
|---|---|---|---|---|
| 2004/0145915 A1* | 7/2004 | Kim | .................... | G02B 6/0036 |
| | | | | 362/559 |
| 2010/0195019 A1* | 8/2010 | Shinohara | ............ | G02B 6/0016 |
| | | | | 349/62 |
| 2011/0176086 A1* | 7/2011 | Sekiguchi | ............ | G02B 6/0046 |
| | | | | 349/62 |
| 2012/0134175 A1* | 5/2012 | Kunimasa | ............ | G02B 6/0016 |
| | | | | 362/602 |
| 2012/0243259 A1* | 9/2012 | Zhou | .................... | G02B 6/0058 |
| | | | | 362/613 |
| 2012/0281166 A1* | 11/2012 | Iwasaki | ................ | G02B 6/0041 |
| | | | | 349/65 |
| 2012/0327685 A1 | 12/2012 | Song et al. | | |
| 2013/0170250 A1* | 7/2013 | Kikuchi | ............... | G02B 6/0038 |
| | | | | 362/609 |
| 2013/0335999 A1* | 12/2013 | Doyle | ................. | G02B 6/0053 |
| | | | | 362/607 |
| 2015/0138487 A1 | 5/2015 | Hirayama et al. | | |

FOREIGN PATENT DOCUMENTS

| | | | |
|---|---|---|---|
| CN | 101276019 | A | 10/2008 |
| CN | 101609230 | A | 12/2009 |
| CN | 101793381 | A | 8/2010 |
| CN | 102472456 | A | 5/2012 |
| CN | 102681083 | A | 9/2012 |
| CN | 202613239 | U | 12/2012 |
| CN | 102866452 | A | 1/2013 |
| CN | 205450509 | U | 8/2016 |
| EP | 1975652 | | 10/2008 |
| JP | 2010039236 | A | 2/2010 |
| TW | 201227016 | A1 | 7/2012 |

\* cited by examiner

DISPLAY BACKLIGHT WITH PATTERNED BACKLIGHT EXTRACTION RIDGES

This application claims the benefit of provisional patent application No. 62/096,065 filed on Dec. 23, 2014, which is hereby incorporated by reference herein in its entirety.

BACKGROUND

This relates generally to electronic devices with displays, and, more particularly, to displays with backlights.

Electronic devices such as computers and cellular telephones have displays. Some displays such as plasma displays and organic light-emitting diode displays have arrays of pixels that generate light. In displays of this type, backlighting is not necessary because the pixels themselves produce light. Other displays contain passive pixels that can alter the amount of light that is transmitted through the display to display information for a user. Passive pixels do not produce light themselves, so it is often desirable to provide backlight for a display with passive pixels.

In a typical backlight assembly for a display, a light guide plate is used to distribute backlight generated by a light source such as a light-emitting diode light source. Optical films such as a diffuser layer and prism films may be placed on top of the light guide plate. A reflector may be formed under the light guide plate to improve backlight efficiency.

A strip of light-emitting diodes may provide light to an edge of a light guide plate. Light scattering features such as bumps may be provided on the light guide plate. Light from the light-emitting diodes that is traveling within the light guide plate may be scattered upwards by the bumps to form backlight for a display. Light guide plates may also sometimes be provided with elongated ridges (sometimes referred to as lenticular features) that help extract backlight from the light guide plate. The ridges are provided in a uniform rectangular region on the light guide plate.

Light from the strip of light-emitting diodes is initially concentrated in the vicinity of the outputs of the light-emitting diodes. The light must travel a sufficient distance into the light guide plate to mix enough to be used as backlight illumination. Backlight units that require large mixing distances may consume more volume within a display than desired. At the same time, reducing the mixing distance in a backlight too much may lead to undesired backlight hotspots.

It would therefore be desirable to be able to provide displays with improved backlights.

SUMMARY

A display may have an array of pixels for displaying images for a viewer. The array of pixels may be formed from display layers such as a color filter layer, a liquid crystal layer, a thin-film transistor layer, and polarizer layers.

A backlight unit may be used to produce backlight illumination for the display. The backlight illumination may pass through the polarizers, the thin-film transistor layer, the liquid crystal layer, and the color filter layer. The backlight unit may have a row of light-emitting diodes that emit light into the edge of a light guide plate.

The light guide plate may have opposing upper and lower surfaces. Backlight may be extracted from the light guide plate using an array of bumps on the lower surface and ridges on the upper surface. The density of the ridges may vary as a function of location across the display to avoid creating backlight hotspots.

If desired, different regions of the light guide plate may have different densities of ridges. Some of the ridges may be terminated along a meandering border between regions with different ridge densities. Ridge lengths and endpoint locations can be dithered about the border to help smooth out the transition in density between the different regions. Ridge widths and thicknesses may also be tapered down towards ridge endpoints to smooth out transitions in ridge density. Ridges may be patterned to locally reduce the density of ridges. For example, ridges may be patterned to reduce the density of ridges immediately adjacent to the light-emitting diodes and thereby avoid over-extraction of the light at the light-emitting diodes.

DETAILED DESCRIPTION

Figure 1:
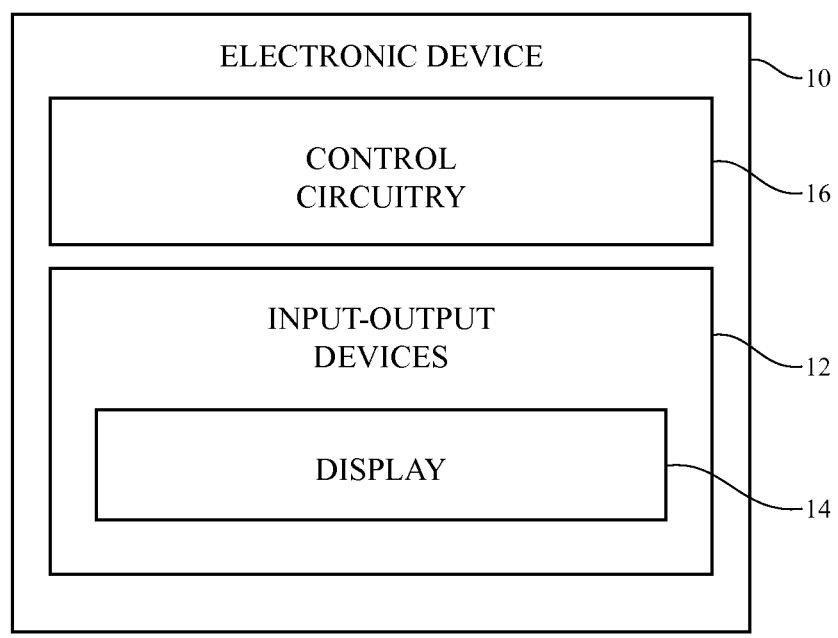
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14.

Device 10 may be a tablet computer, laptop computer, a desktop computer, a television, a cellular telephone, a media player, a wristwatch device or other wearable electronic equipment, or other suitable electronic device.

Display 14 for device 10 includes an array of pixels. The array of pixels may be formed from liquid crystal display (LCD) components or other suitable display structures. Configurations based on liquid crystal display structures are sometimes described herein as an example.

A display cover layer may cover the surface of display 14 or a display layer such as a color filter layer, thin-film transistor layer, or other portion of a display may be used as the outermost (or nearly outermost) layer in display 14. The outermost display layer may be formed from a transparent glass sheet, a clear plastic layer, or other transparent member.

Figure 2:
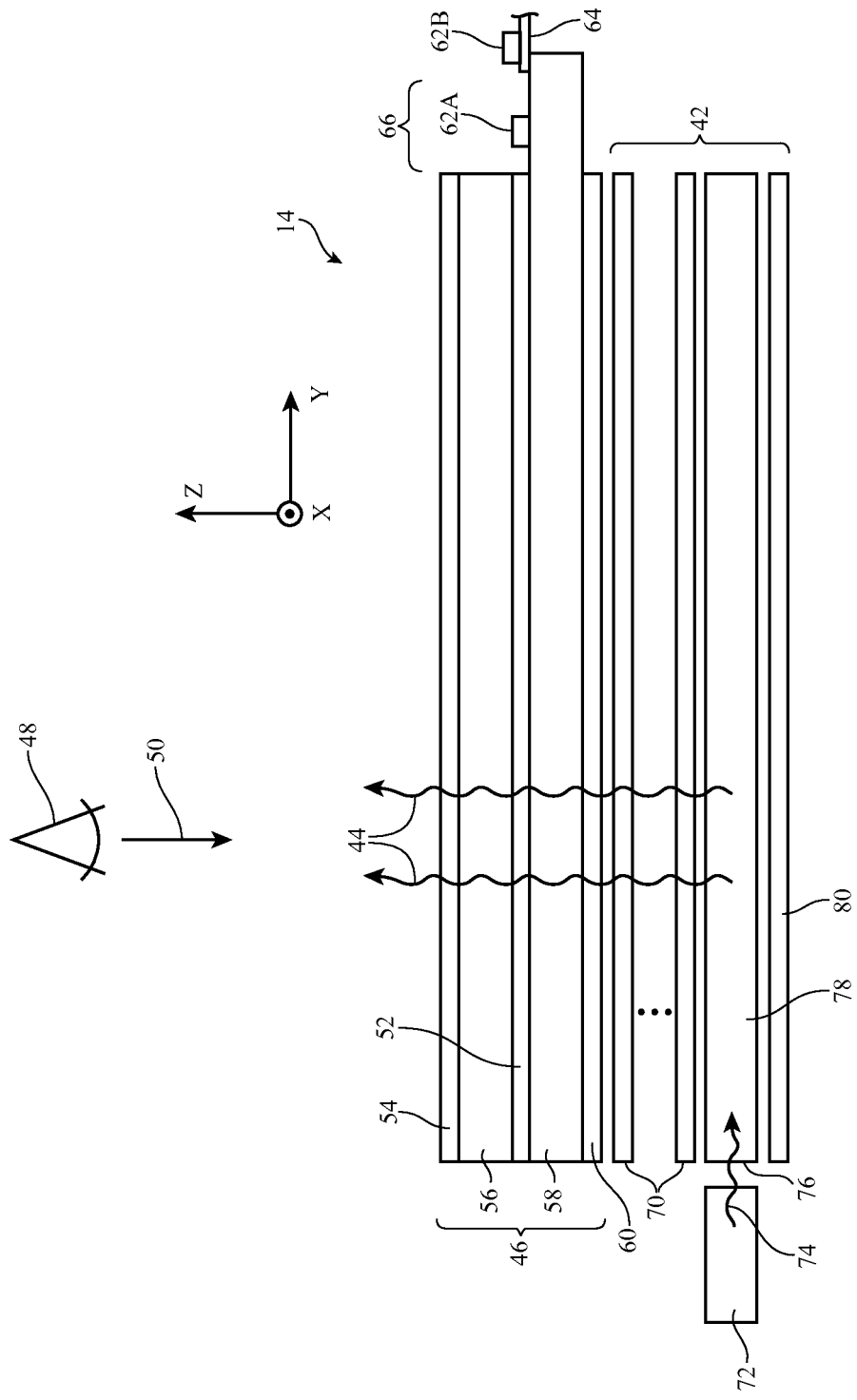
FIG. 2 is a cross-sectional side view of an illustrative display in an electronic device in accordance with an embodiment.

A cross-sectional side view of an illustrative configuration for display 14 of device 10 is shown in FIG. 2. As shown in FIG. 2, display 14 may include a backlight unit such as backlight unit 42 (sometimes referred to as a backlight or backlight structures) for producing backlight 44. During operation, backlight 44 travels outwards (vertically upwards in dimension Z in the orientation of FIG. 2) and passes through pixel structures in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in a housing in device 10 or display layers 46 may be mounted directly in an electronic device housing for device 10 (e.g., by stacking display layers 46 into a recessed portion in a metal or plastic housing). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example). Integrated circuits such as integrated circuit 62A and/or flexible printed circuits such as flexible printed circuit 64 may be attached to substrate 58 in ledge region 66 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes (e.g., a series of light-emitting diodes that are arranged in a row that extends into the page in the orientation of FIG. 2).

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits, bumps, grooves, or ridges that help light exit light guide plate 78 for use as backlight 44. These features may be located on an upper surface and/or on an opposing lower surface of light guide plate 78. With one illustrative configuration, which is described herein as an example, a first surface such as the lower surface of light guide plate 78 has a pattern of bumps and an opposing second surface such as the upper surface of light guide plate 78 has a pattern of ridges (sometimes referred to as lenticules, lenticular structures, or lenticular ridges). Light source 72 may be located at the left of light guide plate 78 as shown in FIG. 2 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upward direction by reflector 80. Reflector 80 may be formed from a reflective structure such as a substrate layer of plastic coated with a dielectric mirror formed from alternating high-index-of-refraction and low-index-of-refraction inorganic or organic layers.

To enhance backlight performance for backlight structures 42, backlight structures 42 may include optical films 70. Optical films 70 may include diffuser layers for helping to homogenize backlight 44 and thereby reduce hotspots. Optical films 70 may also include prism films (sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 2, optical films 70 and reflector 80 may each have a matching rectangular footprint. Optical films 70 may include compensation films for enhancing off-axis viewing or compensation films may be formed within the polarizer layers of display 14 or elsewhere in display 14.

Figure 3:
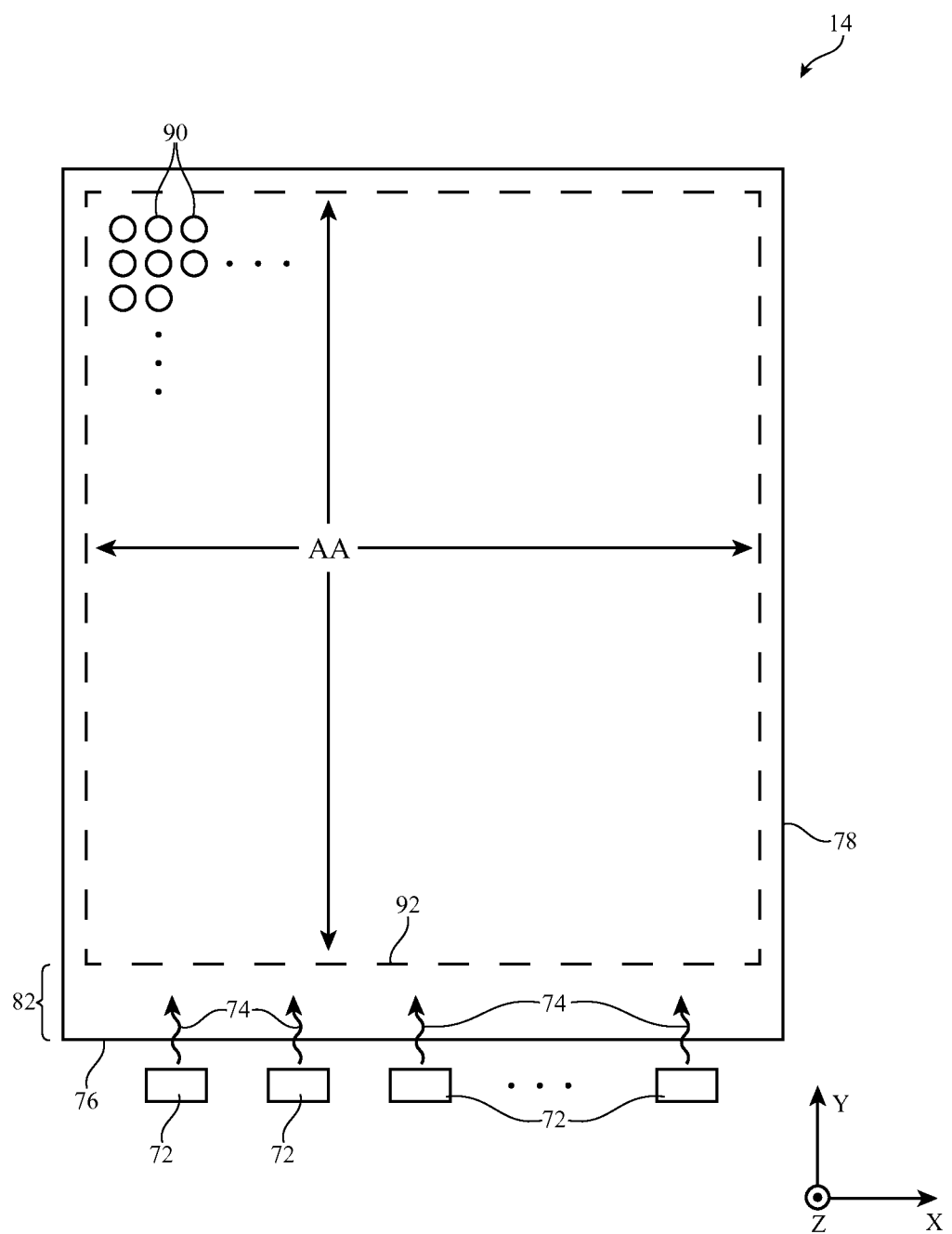
FIG. 3 is a top view of an illustrative display in accordance with an embodiment.

FIG. 3 is a top view of a portion of display 14 showing how display 14 may have an array of pixels 90 formed within display layers 46. Pixels 90 may have color filter elements of different colors such as red color filter elements R, green color filter elements G, and blue color filter elements B. Pixels 90 may be arranged in rows and columns and may form active area AA of display 14. The borders of active area AA may be slightly inboard of the borders of light-guide plate 78 to ensure that there are no visible hotspots in display 14 (i.e., no areas in which the backlight illumination for display 14 is noticeably brighter than surrounding areas). For example, border 92 of active area AA may be offset by a distance 82 from lower edge 76 of light guide plate. It is generally desirable to minimize the size of distance 82 so that display 14 is as compact as possible for a given active area size. Nevertheless, distance 82 should not be too small to ensure that there is adequate light mixing. In particular, distance 82 should be sufficiently large to allow light 74 that is emitted from light-emitting diodes 72 to homogenize enough to serve as backlight illumination. When light 74 is initially emitted from individual light-emitting diodes 72, light 74 is concentrated at the exits of light-emitting diodes 72 and is absent in the spaces between light-emitting diodes 72. After light 74 has propagated sufficiently far within light-guide plate 78 (i.e., after light 74 has traversed a sufficiently large mixing distance 82), light 74 will be smoothly distributed along dimension X and will no longer be concentrated near the exits of respective individual light-emitting diodes 72.

Figure 4:
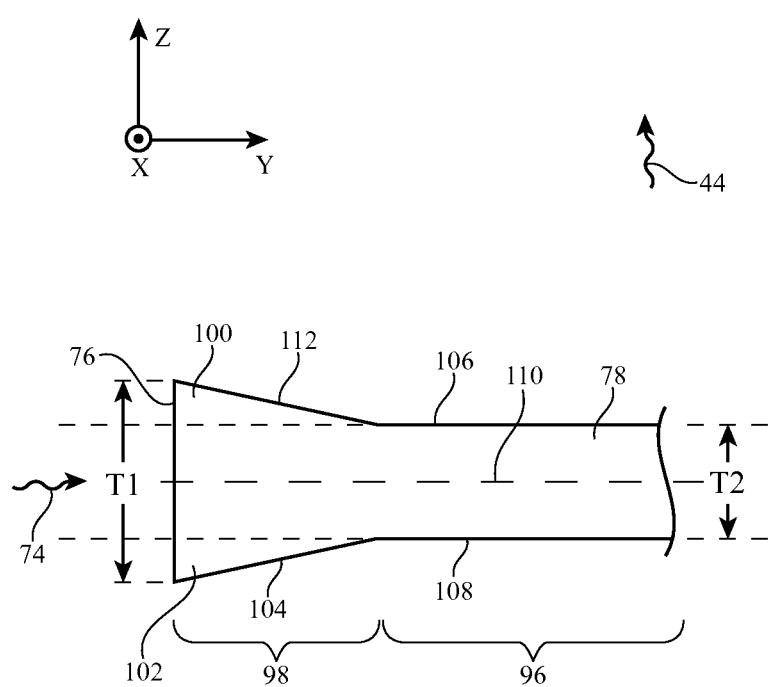
FIG. 4 is cross-sectional side view of an illustrative symmetrically tapered portion of a light guide plate for a display backlight in accordance with an embodiment.

To enhance the efficiency with which light 74 is coupled into edge 76 of light guide plate from light-emitting diodes 72 without overly thickening light-guide plate 78, it may be desirable to provide light-guide plate 78 with an outwardly tapered (flared) edge. Conventional edge tapers are formed by creating a taper in the upper surface of a light guide plate adjacent to the light-emitting diodes and leaving the opposing planar lower surface of the light guide plate untouched. If care is not taken, however, this type of taper may have an angle that is too steep, raising the potential for excessive light leakage due to the loss of total internal reflection conditions in the taper region. With the illustrative taper configuration shown in the cross-sectional side view of illustrative light guide plate 78 of FIG. 4, excessive light losses are avoided by providing light guide plate 78 with both upper and lower taper structures 100 and 102, respectively. Tapers 102 and 100 may be symmetrical or tapers 102 and 100 may have different shapes. In region 96, light-guide plate 78 is planar and has planar parallel opposing upper and lower surfaces 106 and 108, respectively. In taper region 98, light guide plate 78 has a thickness that varies from the thickness of region 96 (T2) to enlarged thickness T1 at edge 76, so taper structure surfaces 112 and 104 are angled at non-zero angles with respect to planar upper and lower light guide plate surfaces 106 and 108. Thickness T2 may be about 400 microns 300-500 microns, less than 600 microns, more than 200 microns, or other suitable thickness. The enlarged size of dimension T1 helps light guide plate 78 receive light 74 from light-emitting diodes 72. The taper in light guide plate 78 formed by taper structures 100 and 102 helps concentrate light 74 into region 96 of light guide plate for use in forming backlight 44.

Figure 5:
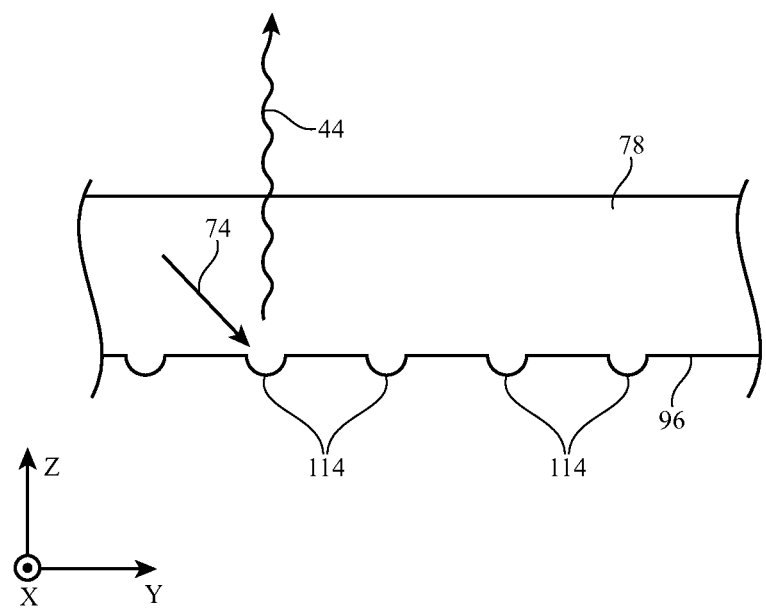
FIG. 5 is a cross-sectional side view of an illustrative light guide plate with light-scattering features such as bumps on its lower surface in accordance with an embodiment.

As shown in FIG. 5, lower surface 96 of light guide plate 78 may be provided with light scattering features such as bumps (protrusions) 114. Bumps 114 may help redirect light 74 that is traveling within the interior of light guide plate 78 upwards in direction Z to serve as backlight 44 for display 14.

Figure 6:
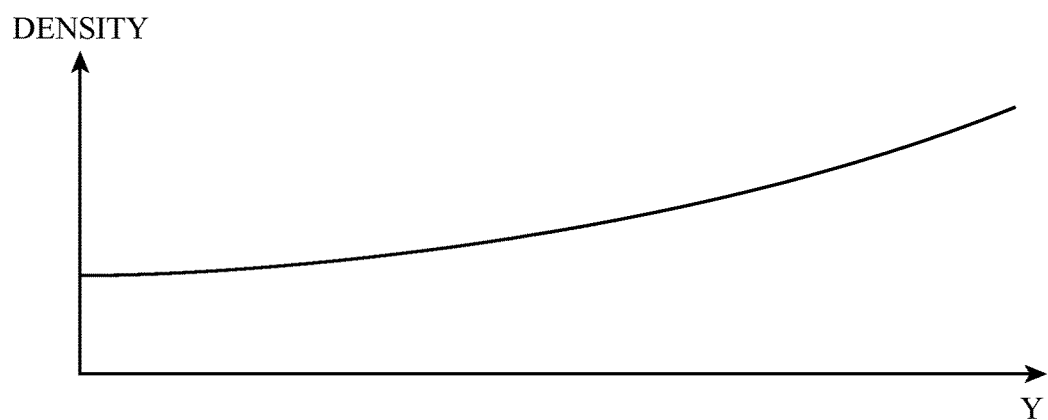
FIG. 6 is graph in which bump density has been plotted as a function of position along the length of a light guide plate in accordance with an embodiment.

As light 74 that is traveling within light guide plate 78 is directed upwards in direction Z to serve as backlight 44, the intensity of the light 74 that remains in light guide plate 78 decreases. As a result, the intensity of light 74 is greatest at edge 76 of light guide plate 78 adjacent to light-emitting diodes 72 and decreases with increasing distance along axis Y away from edge 76. It is generally desirable for the intensity of backlight 44 to be evenly distributed across the surface of light guide plate 78 in dimensions X and Y. To ensure that backlight 44 is not too dim at large values of Y, the density of bumps 114 can be increased as a function of increasing value of Y, as shown in FIG. 6. The increase in the density of bumps 114 at larger Y values offsets the decrease in the intensity of light 74 within light guide plate at larger Y values and thereby ensures that backlight 44 has a uniform intensity as a function of dimension Y.

Figure 7:
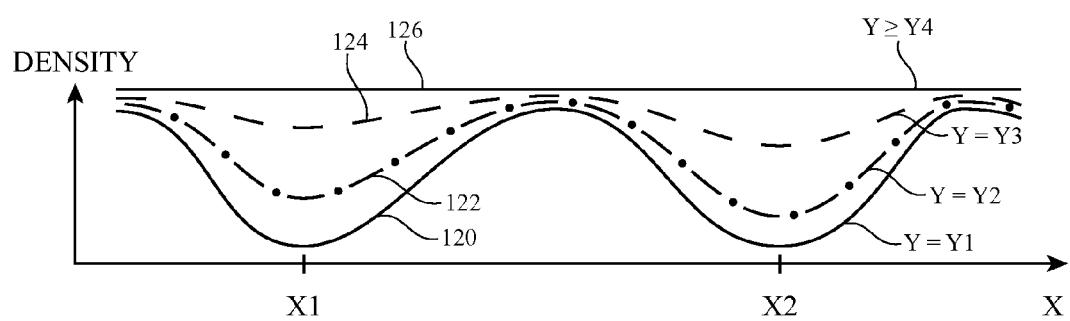
FIG. 7 is a graph in which bump density has been plotted as a function of distance along the width of a light guide plate in accordance with embodiment.

Bumps 114 can be distributed unevenly in dimension X to help counteract the hotspot that would otherwise be associated with each light-emitting diode. An illustrative lateral bump density distribution is shown in FIG. 7 for multiple locations in dimension Y. In the example of FIG. 7, a first light-emitting diode is emitting light 74 into edge 76 at location X1 and a second light-emitting diode is emitting light 74 into edge 76 at location X2. There is therefore a natural tendency for backlight 44 to be concentrated about locations X1 and X2, particularly at low Y values immediately adjacent to edge 76. This can be counteracted by locally reducing the density of bumps 114 at the exits of light-emitting diodes 72 (i.e., by reducing the density of bumps 114 at positions X1 and X2). An illustrative bump density reduction scheme of this type is illustrated by curves 120, 122, 124, and 126 of FIG. 7. Curve 120 corresponds to the density of bumps 114 adjacent to edge 76 (dimension Y1). The decrease in bump density is greatest at this Y location, because light 74 tends to be most concentrated just after being emitted into edge 76 of light guide plate 78. At slightly larger Y values such as Y value Y2, it is not necessary to locally reduce the bump density as much, so the localized reductions in bump density at Y2 are lower than at Y1, as shown by curve 122. Curve 124 illustrate how the density of bumps 114 may be reduced by a further decreased amount at larger Y value Y3. At Y locations greater than Y4 (e.g., about 0.5 to 1 mm, 0.5 to 10 mm, 1-5 mm, more than 1 mm, less than 10 mm, etc.) the density of bumps 114 may be constant as a function of lateral dimension X (and may vary in dimension Y as shown in FIG. 6).

Figure 8:
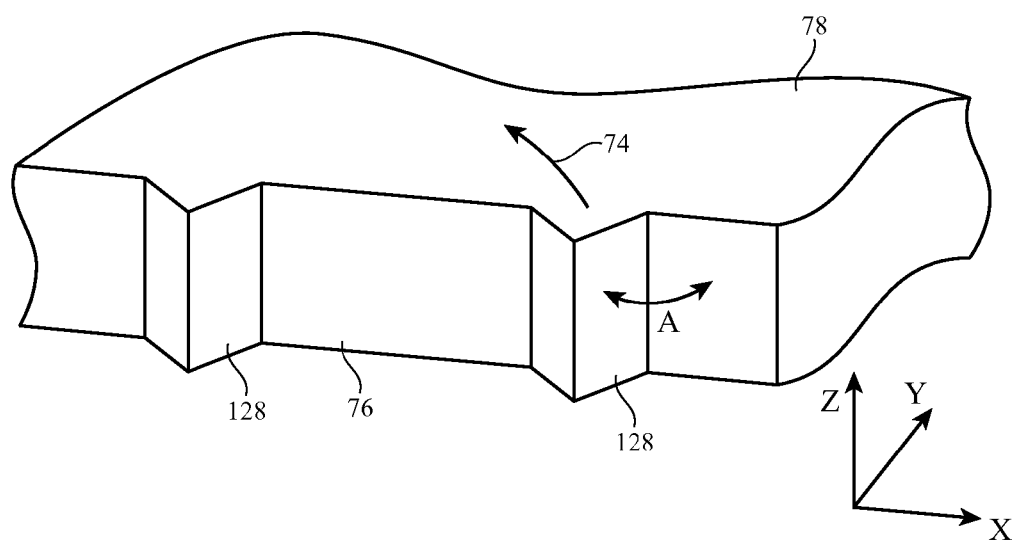
FIG. 8 is a perspective view of illustrative light guide plate edge protrusions in accordance with embodiment.

To enhance light mixing as light 74 is emitted into edge 76 of light guide plate 78, edge 76 may be provided with locally raised features such as protrusions 128 of FIG. 8. Protrusions 128 may have triangular profiles (in the XY plane of FIG. 8), may have semicircular profiles, or may have other shapes. Angle A may be about 140-160° or other suitable value to help refract light 74 at relatively steep angles in plate 78, as shown by illustrative light ray 74 of FIG. 8, thereby enhancing light mixing and helping to reduce mixing distance 82 (FIG. 3). Protrusions 128 may have widths (in dimension X) of about 75-125 microns or other suitable widths. Protrusions 128 may be spaced apart by about 250 microns, 200-300 microns, less than 320 microns, or more than 150 microns (as examples). Protrusions 128 may be spread evenly along edge 76 or may be clustered adjacent to respective light-emitting diodes 72.

Figure 9:
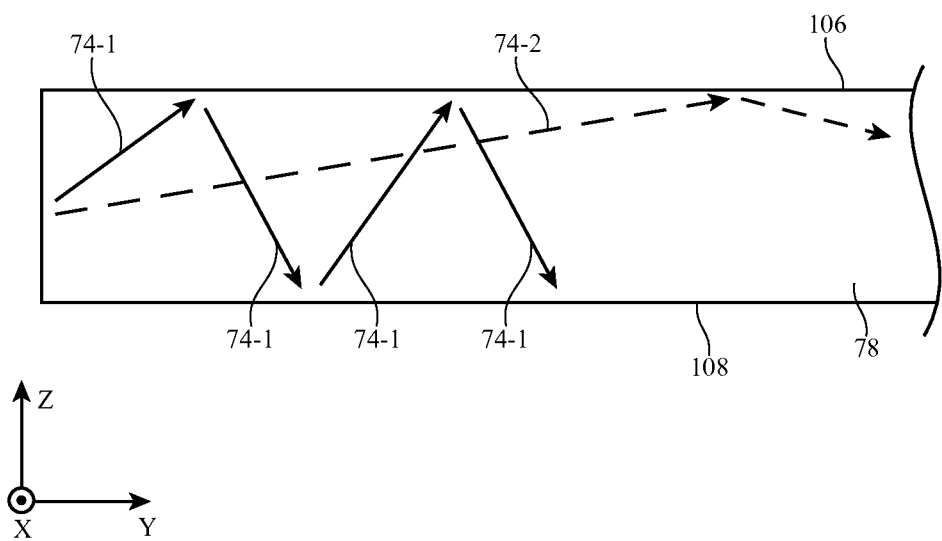
FIG. 9 is a cross-sectional side view of a light guide plate showing how different light rays interact with the surfaces of the light guide plate by different amounts in accordance with an embodiment.
Figure 10:
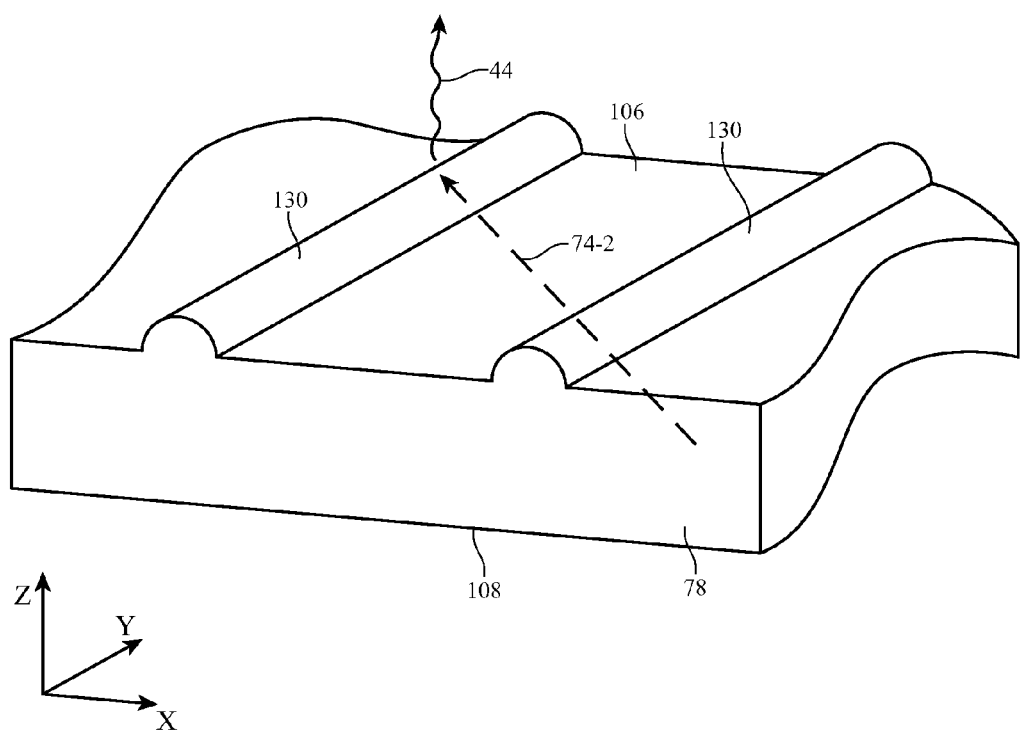
FIG. 10 is a cross-sectional perspective view of a light guide plate showing how rounded ridges may extend along the upper surface of the light guide plate in accordance with an embodiment.

Light-emitting diodes 72 emit light 74 in a cone. This cone of light includes highly angled off-axis light rays. As shown in the cross-sectional side view of light guide plate 78 of FIG. 9, some of the highly angled light rays such as light ray 74-1 lie primarily in the YZ plane. These light rays interact strongly with upper surface 106 and lower surface 108 of light guide plate and therefore tend to be heavily extracted by bumps 114 on lower surface 108. Other highly angled light rays in the cone of emitted light 74 such as illustrative light ray 74-2 in FIG. 9 lie primarily in the XY plane. These rays are angled more along dimension X than dimension Z and therefore interact with surfaces 106 and 108 less frequently than ray 74-1. To ensure that light rays such as light ray 74-2 are adequately extracted and can serve as backlight 44, light guide plate 78 may be provided with lenticular ridges such as ridges 130 of FIG. 10. Ridges 130 may be formed on upper surface 106 of light guide plate 78 (as an example). As shown in FIG. 10, ridges 130 may run parallel to dimension Y (i.e., the direction in which the exit faces of light-emitting diodes 72 are oriented and the direction in which light 74 is emitted into edge 76 of light guide plate 78). Ridges 130 may have semicircular cross-sectional shapes or may have other suitable shapes (triangular, etc.). As shown in FIG. 10, the presence of ridges 130 may help extract highly angled light rays such as light ray 74-2 that are propagating close to the XY plane to produce corresponding backlight 44.

A conventional light guide plate may have a rectangular pattern of parallel ridges that evenly covers the surface of the light guide plate. This type of uniform ridge pattern tends to over-extract light that has just been injected from the light-emitting diodes, leading to hotspots along the edge of the light guide plate. The tendency of conventional ridge arrangements to locally over-extract light can be exacerbated when using highly angled protrusions such as protrusions on the edge of light guide plate that is receiving the light from the light-emitting diodes (see, e.g., protrusions 128 of FIG. 8).

To reduce or eliminate these hotspots and therefore allow mixing distance 82 to be minimized, ridges 130 on light guide plate 78 can be implemented using a non-uniform pattern. Consider, as an example, the illustrative pattern of ridges 130 shown in FIG. 11. Different areas in light guide plate 78 of FIG. 11 each have a different density of ridges 130. Borders 134 and 132 separate regions with different respective ridge densities. Border 136 separates ridges 130 from taper region 98.

Ridges 130 include ridges 130-1 that terminate at endpoints along border 132. Ridges 130-2 extend past border 132 and terminate at border 134. Ridges 130-2 therefore tend to be longer than ridges 130-1. Ridges 130-3 extend to border 136 between tapered region 98 and planar region 96. Ridges 130-1, 130-2, and 130-3 may all extend continuously in direction Y until reaching the edge of light guide plate 78 opposing edge 76.

Figure 11:
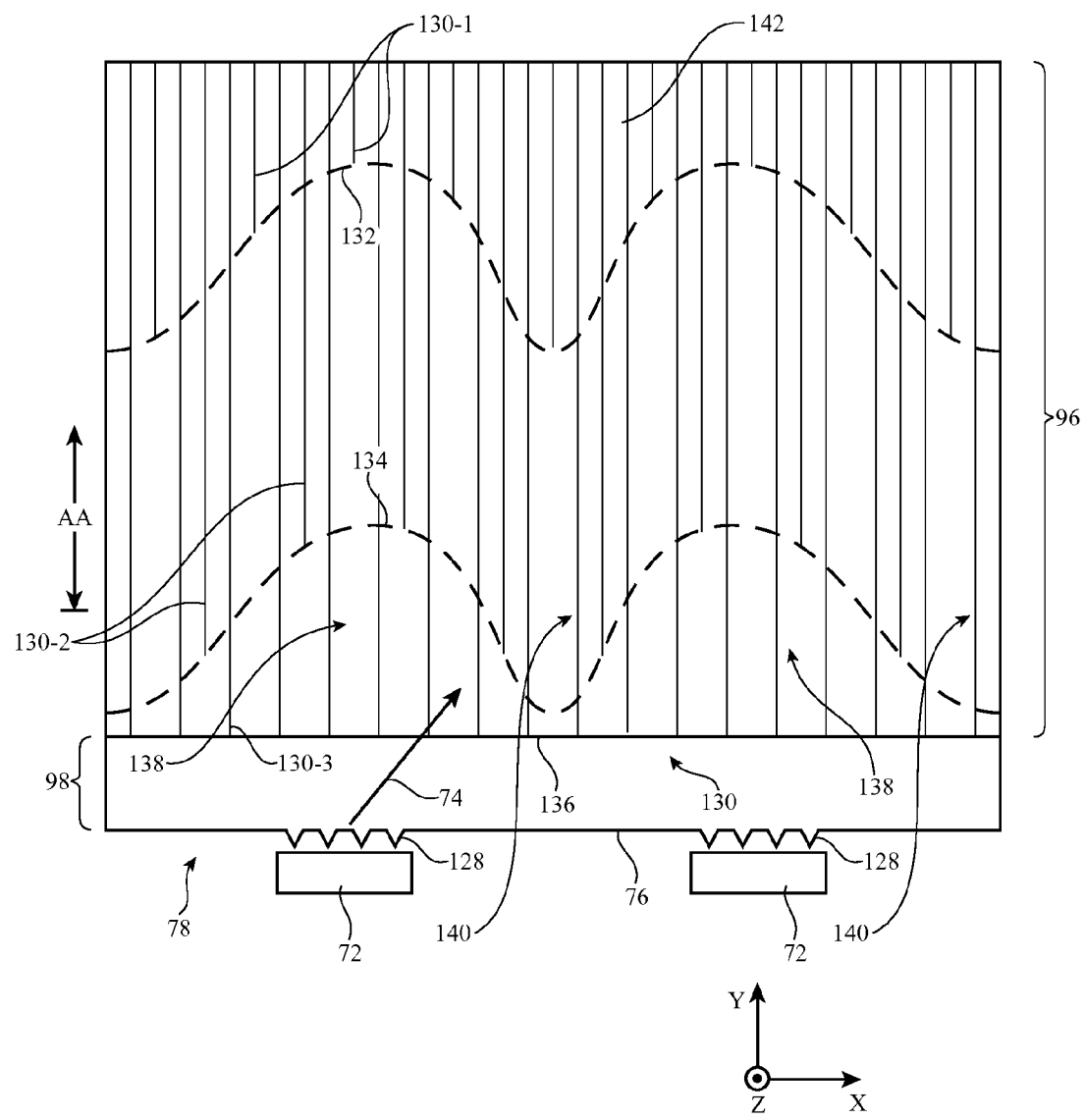
FIG. 11 is a diagram of an illustrative variable density ridge pattern that may be used in a light guide plate in accordance with an embodiment.

Because different ridges 130 cover different portions of light guide plate 78 with different densities, the amount of light extraction produced by ridges 130 varies as a function of lateral position on light guide plate 78 (i.e., the density of ridges 130 varies as a function of position in the X-Y plane of FIG. 11). This allows the amount of light extraction produced by ridges 130 to be selectively reduced in the vicinity of light-emitting diodes 72. For example, the relative scarcity of ridges 130 in region 138 helps prevent over-extraction of light 74 in region 138. Region 140 extends between light emitting diodes 72 and does not receive as much of light 74 as region 138. There is therefore a risk that region 140 will become too dark. With the illustrative pattern of FIG. 11, region 140 has been provided with more ridges (i.e., ridges 130-2) than region 138 and therefore exhibits more light extraction than region 138. This helps balance the amount of light extracted in region 138 (where there is ample light and therefore fewer light extraction ridges) and region 140 (where there is less light and therefore more light extraction ridges to compensate).

In general, light guide plate 78 may be provided with a continuously varying ridge density, two or more areas with two or more respective ridge densities, or other patterns of ridges. In the example of FIG. 11, there are three different areas each of which has a different respective density of ridges. Area 138 contains only ridges 130-1 and therefore has a relatively low ridge density. Area 138 may be located near light-emitting diodes 72 to prevent over-extraction of light 74. Area 140 contains both ridges 130-1 and ridges 130-2 and therefore has a higher ridge density than area 138. Area 142 contains ridges 130-1, 130-2, and 130-3 and therefore has a higher ridge density than area 140. The presence of third area 142 (i.e., use of three different ridge density regions) helps smooth out the intensity of extracted backlight. If desired, additional areas with different respective ridge densities may be provided (e.g., four or more regions, continuously varying density portions, etc.). The use of three distinct ridge densities in the illustrative light guide plate of FIG. 11 is merely an example.

Figure 12:
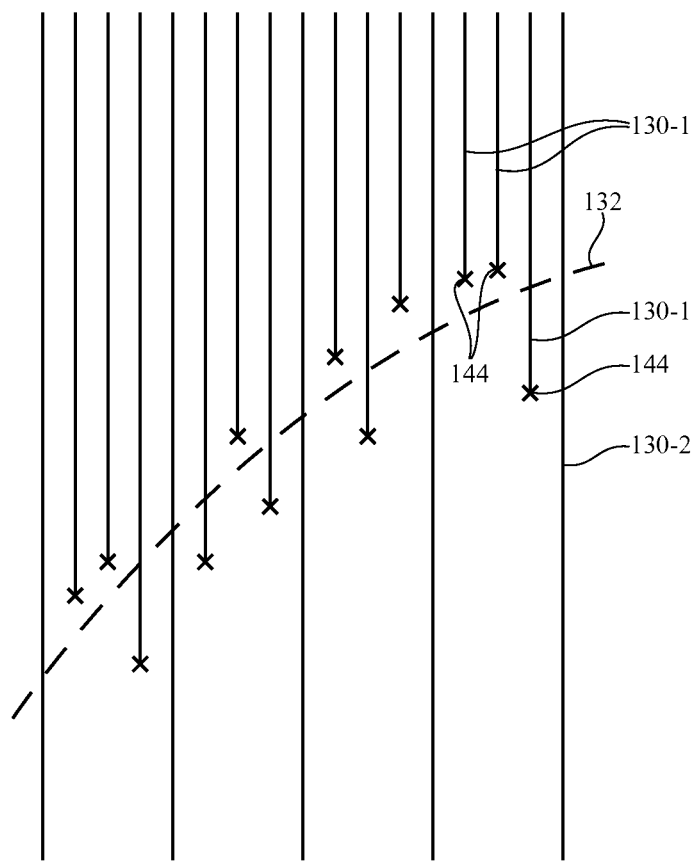
FIG. 12 is a top view of a portion of a light guide plate showing how the endpoint locations of ridges may be randomized along a border between two different areas of different ridge density to help reduce visible variations in backlight intensity along the border in accordance with an embodiment.

The homogeneity of backlight 44 can be enhanced by using smooth shapes for borders 134 and 132 (e.g., curved paths in the example of FIG. 11). Backlight homogeneity may also be enhanced by imposing pseudorandom variations on the locations of the ends of the ridges. As shown in FIG. 12, for example, the locations of endpoints 144 of ridges 130-1 need not terminate precisely along border 132. Imposing slight variations in the lengths of ridges 130-1 (i.e., dithering the lengths of the ridges) allows these ridges to be aligned with a desired border (e.g., border 132 in the FIG. 12 example) while helping to ensure that the ridge density transition associated with border 132 does not produce backlight intensity variations that are visible to viewer 48.

Figure 13:
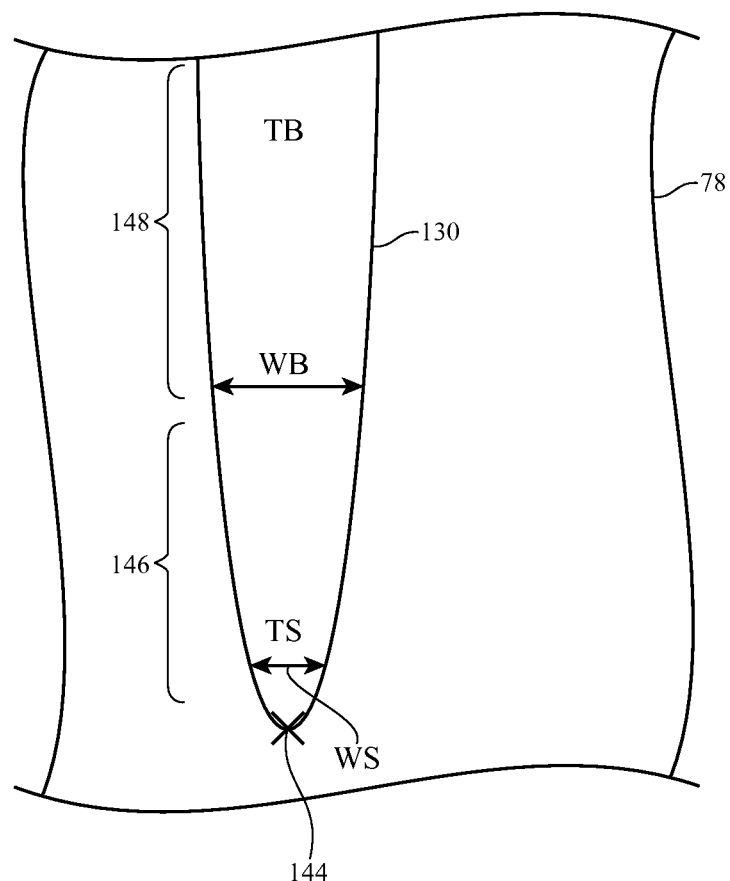
FIG. 13 is a top view of an illustrative tapered ridge in a light guide plate in accordance with an embodiment.

Another way to smooth the transition between regions of differing ridge density involves imposing a tapering width and/or thickness on the ends of ridges 130. This type of arrangement is shown in FIG. 13. As shown in FIG. 13, ridge 130 may be characterized by a thickness TB and a width WB in main region 148. The width of ridge 130 and the thickness of ridge 130 may be smoothly reduced towards endpoint 144 (i.e., the ridge may taper to smaller thicknesses towards the endpoint). For example, in end region 146, ridge 130 may have reduced thicknesses such as thickness TS (TS<TB) and reduced widths such as width TS (WS<WB). Tapering the width, thickness, or other characteristic along the length of ridge 130 towards the end of ridge 130 helps make the location of endpoint 144 visually indistinct and therefore helps to ensure that transitions between light guide plate regions with different ridge densities are not noticeable to a viewer.

Light guide plate 78 may be formed by shaping a polymer layer using a metal blank. Grooves with varying depths and widths may be formed in the metal blank by varying the operating height of a grinding bit during groove formation. A metal blank with grooves of varying depth and width may be used in forming a light guide plate with corresponding ridges of varying thickness and width (i.e., ridges with thicknesses that taper down to smaller values as the ridges extend towards their endpoints).

In general, any one or more of these schemes for reducing the visibility of ridge density transitions on light guide plate 78 and for reducing hotspots may be used (e.g., selective variation of ridge density, use of multiple regions with distinct ridge densities, imposing small variations on the locations of ridge endpoints while still aligning the ridge endpoints with a desired ridge density region border, varying thickness and width of ridges, etc.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
   display layers that form an array of pixels; and
   a backlight that illuminates the array of pixels, wherein the backlight includes a light guide plate having ridges, wherein the ridges have different densities in different portions of the light guide plate, wherein the light guide plate has an edge, wherein the backlight includes an array of light-emitting diodes along the edge that emit light into the light guide plate through the edge, wherein each ridge has a respective length and extends along a longitudinal axis perpendicular to the edge, wherein each ridge has a uniform cross-section along the respective length, and wherein the number of ridges per unit area is selectively decreased adjacent to the light-emitting diodes.

2. The display defined in claim 1 wherein the light guide plate has at least a first region in which the ridges have a first density and a second region in which the ridges have a second density that is greater than the first density, wherein the first density comprises a first number of ridges per unit area, and wherein the second density comprises a second number of ridges per unit area.

3. The display defined in claim 2 wherein the first and second regions are separated by a border and wherein the ridges have end points with positions that are dithered about the border.

4. The display defined in claim 2 wherein the first and second regions are separated by a border, wherein at least some of the ridges have endpoints at the border, and wherein at least some of the ridges with endpoints at the border have thicknesses that taper down towards the endpoints.

5. The display defined in claim 2, wherein the first and second regions are separated by a curved border.

6. The display defined in claim 2, wherein the first region has a plurality of portions each of which is aligned with a respective one of the light-emitting diodes.

7. The display defined in claim 1 wherein the light guide plate has protrusions on the edge.

8. The display defined in claim 1 wherein the light guide plate has a tapered thickness along the edge.

9. The display defined in claim 1 wherein the light guide plate has a symmetrical tapered thickness having an upper tapered portion on an upper surface of the light guide plate and a symmetrical lower tapered portion on an opposing lower surface of the light guide plate.

10. The display defined in claim 1 wherein the display layers include a liquid crystal layer sandwiched between first and second substrates.

11. The display defined in claim 10 wherein the light guide plate has opposing first and second surfaces, wherein the ridges are on the first surface, and wherein the display further comprises bumps on the second surface.

12. The display defined in claim 1, wherein the ridges are formed on an upper surface of the light guide plate.

13. A display, comprising:
    display layers that form an array of pixels; and
    a backlight that illuminates the array of pixels, wherein the backlight includes a light guide plate having an edge between an upper surface and a lower surface and ridges on the upper surface, wherein the upper surface is interposed between the display layers and the lower surface, wherein the backlight includes an array of light-emitting diodes along the edge that emit light into the light guide plate through the edge, wherein the light guide plate has at least a first region in which the ridges have a first density and a second region in which the ridges have a second density that is greater than the first density, wherein the first and second regions are separated by a curved border, and wherein the first region has a plurality of portions each of which is aligned with a respective one of the light-emitting diodes.

14. The display defined in claim 13 wherein the light guide plate has a symmetrically tapered thickness along the edge.

15. The display defined in claim 14 further comprising protrusions on the edge, wherein the protrusions are adjacent to the light-emitting diodes and receive light from the light emitting diodes.

16. The display defined in claim 13, wherein each ridge extends along an axis perpendicular to the edge.

17. A liquid crystal display, comprising:
    first and second transparent substrates;
    a liquid crystal layer between the first and second substrates; and
    backlight structures that produce backlight that passes through the first and second substrates and the liquid crystal layer, wherein the backlight structures include a light guide plate, wherein the light guide plate has a first pair of opposing edges that extend along a first dimension and a second pair of opposing edges that extend along a second dimension perpendicular to the first dimension, wherein the backlight structures include light-emitting diodes that emit light into one of the first pair of edges, wherein the light guide plate has a plurality of parallel ridges that run parallel to the second pair of edges, wherein the light guide plate has a first region in which the ridges have a first density of the number of ridges, a second region adjacent the first region in which the ridges have a second density of the number of ridges that is greater than the first density, and a third region adjacent the second region in which the ridges have a third density of the number of ridges that is greater than the second density, and wherein the first region is interposed between the light-emitting diodes and the second region.

18. The liquid crystal display defined in claim 17 wherein the ridges include ridges of different lengths and wherein the light guide plate has a symmetrically tapered profile along the edge into which the light is emitted.

19. The liquid crystal display defined in claim 17, wherein the first and second regions are separated by a first curved border and the second and third regions are separated by a second curved border.

20. The liquid crystal display defined in claim 17, wherein the light guide plate has an upper surface and a lower surface, wherein the upper surface is interposed between the lower surface and the liquid crystal layer, and wherein the plurality of parallel ridges are formed on the upper surface of the light guide plate.

\* \* \* \* \*